(12) United States Patent
Artymov et al.

(10) Patent No.: US 6,560,775 B1
(45) Date of Patent: May 6, 2003

(54) BRANCH PREPARATION

(75) Inventors: Alexander M. Artymov, Moscow (RU); Boris A. Babaian, Moscow (RU); Feodor A. Gruzdov, Moscow (RU); Alexey P. Lizorkin, Moscow (RU); Yuli K. Sakhin, Moscow (RU); Evgeny Z. Stolyarsky, Moscow (RU)

(73) Assignee: Elbrus International Limited, George Town Gran Cayman (KY)

( * ) Notice: Subject to any disclaimer, the term of this patent is extended or adjusted under 35 U.S.C. 154(b) by 0 days.

(21) Appl. No.: 09/220,502

(22) Filed: Dec. 24, 1998

Related U.S. Application Data

(60) Provisional application No. 60/071,388, filed on Jan. 15, 1998.

(51) Int. Cl.$^7$ .............................. G06F 9/45; G06F 9/32
(52) U.S. Cl. ....................... 717/151; 717/149; 717/159; 712/9; 712/215; 712/233
(58) Field of Search .............................. 712/21, 239, 4, 712/1, 9, 23, 215, 233–240; 711/140; 708/521; 717/4, 5, 6, 7, 8, 9, 114, 140, 149, 151–161

(56) References Cited

U.S. PATENT DOCUMENTS

| | | | |
|---|---|---|---|
| 4,295,193 A | * 10/1981 | Pomerene | 712/215 |
| 4,833,599 A | * 5/1989 | Colwell et al. | 712/236 |
| 5,203,002 A | * 4/1993 | Wetzel | 712/21 |
| 5,860,017 A | 1/1999 | Sharangpani | 712/23 |

OTHER PUBLICATIONS

Kathail, Vinod, et al., HPL Play–Doh Architecture Specification: Version 1.0, Feb. 1994, Computer Systems Lab., HPL–93–80.

* cited by examiner

*Primary Examiner*—Tuan Q. Dam
(74) *Attorney, Agent, or Firm*—Townsend and Townsend and Crew LLP

(57) ABSTRACT

A method and system for preparing branch instruction of a computer program, for compiling and execution in a computer system, in which each transfer instruction is split into two instructions: a control transfer preparation instruction and a control transfer instruction, wherein the control transfer preparation instruction contains the transfer address and is placed by the compiler several instructions ahead of the control transfer instruction, so that the number of clock cycles in the pipeline between transfer condition generation and transfer itself would be reduced.

15 Claims, 2 Drawing Sheets

```
 84:   control transfer preparation
 ...   ...
 96:   sub Rt ← Ra-Rb
102:   control transfer instruction
104:   store Ra
108:   add
 ...   ...
200:   load
 ...   ...
```

```
 96:   sub Rt ← Ra-Rb
100:   br if Rt<0 to 200
104:   store Ra
108:   add
...    ...
200:   load
...    ...
```

FIG. 2A

```
 84:   control transfer preparation
...    ...
 96:   sub Rt ← Ra-Rb
102:   control transfer instruction
104:   store Ra
108:   add
...    ...
200:   load
...    ...
```

FIG. 2B

BRANCH PREPARATION

This application claims benefit of provisional application Ser. No. 60/071,388 filed Jan. 15, 1998.

BACKGROUND OF THE INVENTION

Pipeline processor systems are well known in the art. See, e.g., Parallel and Distributed Computing Handbook, A. Y. H. Zomaya, Ed. (McGraw-Hill 1996), which is hereby incorporated by reference. One of the most essential factors affecting processor performance is the delay between the pipeline stage at which a transfer condition becomes known (E stage) and the stage whose operation depends on occurrence of the condition (F stage). In spite of hardware facilities that perform almost perfect dynamic branch direction prediction, mispredictions have a profound impact on CPU performance. Therefore, reduction of this delay, i.e., reduction of the number of clock cycles in the pipeline between transfer condition generation and transfer itself, has an important bearing on CPU performance.

SUMMARY OF THE INVENTION

The present invention achieves a decrease in the delay between transfer condition generation and branch execution by commencing execution of two or more branches that follow a transfer instruction before determination of the transfer condition. One of the branches may be moved forward along the system's main pipeline while other branches begin to execute in parallel along additional pipelines initialized by the system.

In accordance with a first preferred embodiment of the present invention, each transfer instruction is split into two instructions: a control transfer preparation instruction and a control transfer instruction. The control transfer preparation instruction contains the transfer address and is placed by the compiler several instructions ahead of the control transfer instruction. Execution of the control transfer preparation instruction initializes an additional parallel pipeline which duplicates a certain initial part of the main pipeline and executes instructions from the branch. Once the additional pipeline is filled, it is frozen pending determination of the transfer condition. The control transfer instruction is executed when the control transfer condition becomes known. If control is to be transferred to the branch, the number of the additional pipeline whose execution should be continued on the main pipeline is indicated in the control transfer instruction.

In a second preferred embodiment, a first portion of the additional pipeline, which does not use the contents of any register that may be modified by the main pipeline, is filled and frozen. A second portion of the additional pipeline, which may be affected by the contents of a register that may be modified by the main pipeline, is reexecuted every clock cycle.

BRIEF DESCRIPTION OF THE DRAWINGS

FIG. 2a represents a segment of program code before application of the present invention; and FIG. 2b represents one illustrative embodiment of the segment of program code after application of the present invention.

DETAILED DESCRIPTION OF THE PREFERRED EMBODIMENTS

Figure 1:
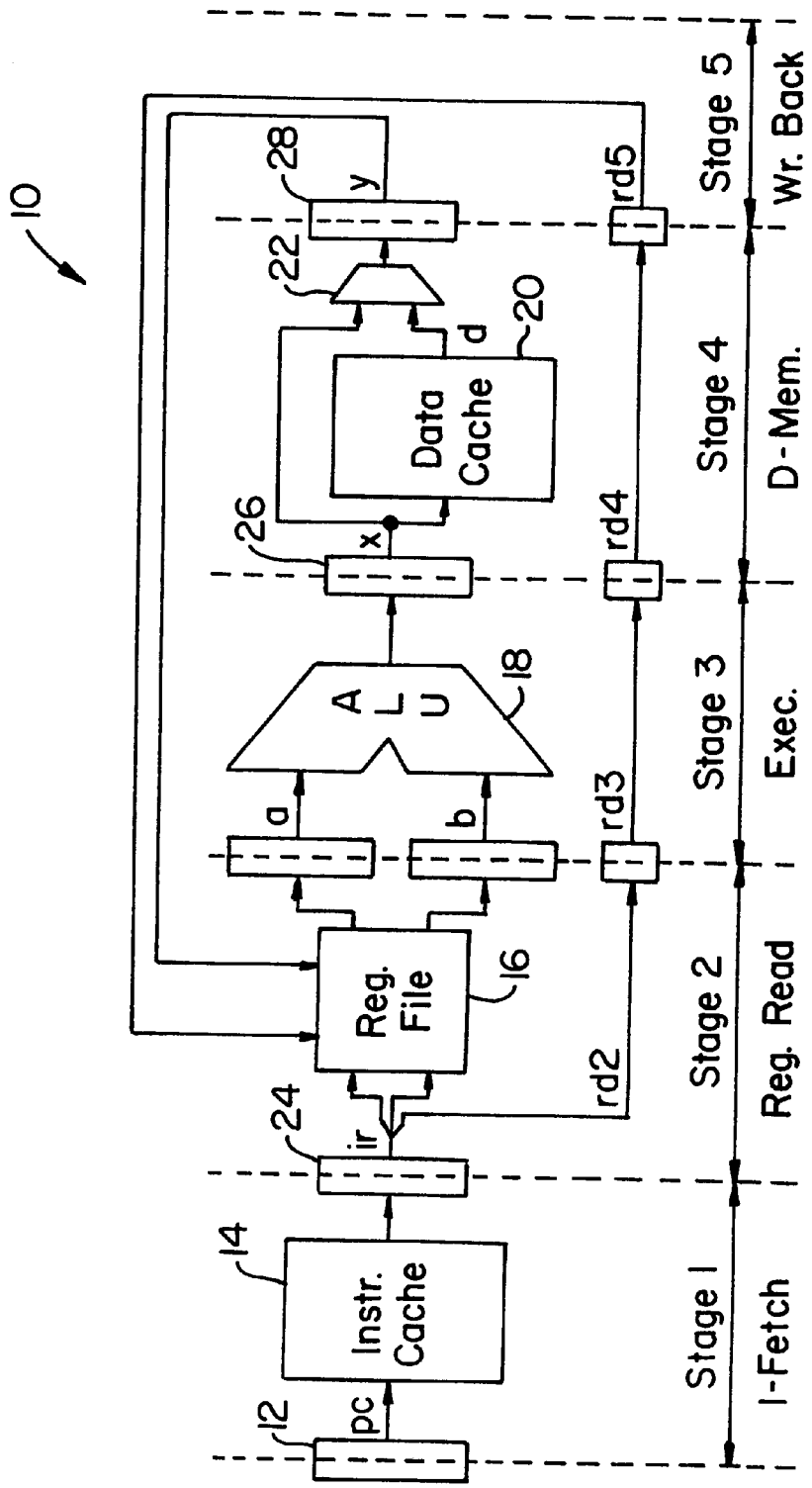
FIG. 1 is a schematic representation of a typical five-stage pipeline system.

FIG. 1 is a schematic representation of a typical five-stage pipeline system. As shown in FIG. 1, pipeline 10 comprises a program counter 12, an instruction cache 14, a register file 16, an ALU 18, a data cache 20, and a multiplexer 22. In addition, pipeline 10 comprises an instruction register 24, a first source register RSA, a second source register RSB, a first destination register RD3, a result register 26, a second destination register RD4, a final result register 28, and a third destination register RD5.

During operation, in a first clock cycle, program counter 12 causes the next instruction to be read from instruction cache 14 into instruction register 24.

In a second clock cycle, the instruction in instruction register 24 is decoded into an opcode and three addresses. The first address is that of the first source operand, the second address is that of the second source operand, and the third address is that of the destination operand. The first two addresses are supplied to register file 16 which provides the contents of the addressed registers to source registers RSA and RSB, respectively. The third address is supplied to RD3.

In a third clock cycle, the content of RSA and RSB are supplied to ALU 18. The result is clocked into result register 26. Also on the third clock cycle, the contents of RD3 are clocked into RD4.

In a fourth clock cycle, if the operation is a load or store operation, the output of result register 26 is used as an address for a data cache access; if the instruction is a load, the data read out of data cache 20 is clocked out into final result register 28. If the operation is not a load or store operation, the system does nothing this stage (i.e., top branch of multiplexer 22 is enabled). Also on the fourth clock cycle, the contents of RD4 are clocked into RD5.

In a fifth clock cycle, register file 16 is updated by writing the contents of final register 28 to the register identified by the address in RD5.

FIG. 2a represents a segment of program code before application of the present invention. Instruction 100 of the segment is a transfer instruction that transfers the program to instruction 200 if the contents of register Rt<0.

FIG. 2b represents one illustrative embodiment of the segment of program code after application of the present invention. As shown in FIG. 2b, the compiler has divided transfer instruction 100 into two instructions: a control transfer preparation instruction 84 and a control transfer instruction 102.

Execution of transfer preparation instruction 84 in the main pipeline causes the system to initialize an additional pipeline. The program counter of the additional pipeline is set to the first instruction in the branch (i.e., instruction 200). During ensuing clock cycles, the branch instructions execute in the additional pipeline as execution of the rest of the program continues in the main pipeline.

In a first preferred embodiment, once the additional pipeline is filled, it is frozen pending resolution of the transfer condition. In this preferred embodiment, actions performed in an additional pipeline should not use registers whose contents may be changed in the main pipeline.

In some cases, however, it may be desirable to include actions in the additional pipeline that use registers that may be modified by the main pipeline. For example, assume that prior to an RF read it is desired to calculate an effective RF address by adding the value of a modifiable base pointer to a register number in an operation code. In the first preferred embodiment, this action should not be executed as part of an additional pipeline since the value of the modifiable base pointer might be changed by the main pipeline. In such cases, the second preferred embodiment described below may instead be employed.

In the second preferred embodiment, the additional pipeline is divided into two portions. The first portion comprises those stages of the pipeline that are upstream from any operation that accesses a register that may be modified by the main pipeline. The second portion comprises those stages that access a register that may be modified by the main pipeline and all stages downstream from such stages.

In the second preferred embodiment, the first portion of the additional pipeline is filled and frozen, as described above in connection with the first preferred embodiment. The second portion of the additional pipeline reexecutes every clock cycle. In this way, the second portion of the additional pipeline is certain to operate on the latest contents of any register that may have been modified by the main pipeline. Advantageously, because the first portion of the additional pipeline is filled and frozen, the increased ICache throughput required to operate the additional pipeline is minimized.

Control transfer instruction 102 is executed when the transfer condition becomes known. If control is to be transferred to the branch, the number of the additional pipeline whose execution should be continued on the main pipeline is indicated in the control transfer instruction.

It should be noted that the present invention contemplates that more than one additional pipeline may operate simultaneously depending on the system's capabilities and the number and location of branches in the program. It should also be noted that the approach of the present invention requires an increase in ICACHE throughput. In addition, the direct (fall through) path may be moved forward along the main pipeline, which also leads to performance enhancement.

Thus, in accordance with the present invention, the branch turns out to be already moved forward along the pipeline when transfer control instruction 102 is executed. This leads to a reduction in the gap between the moment of the control transfer condition appearance and the target instruction.

The number of stages a branch may be moved forward, i.e., the additional pipeline length, depends on CPU architecture and additional hardware which can be used for this purpose. In particular, in some architectures, for example VLIW, a branch may be moved forward up to operand read from the register file. Further lengthening of a pipeline is possible, but requires additional read ports.

What is claimed is:

1. An improved processing system, comprising:
   a first pipeline executing a program;
   at-least one additional pipeline;
   wherein the program comprises: at least one branch;
   a control transfer preparation instruction, the control transfer preparation instruction comprising a transfer address of the branch and adapted to cause initialization of the at least one additional pipeline and execution in the additional pipeline of instructions from the branch simultaneous with execution of the program in the first pipeline; and
   a control transfer instruction, the control transfer instruction comprising an identifier for the at least one additional pipeline and adapted to cause control to move to the branch being executed in the additional pipeline upon occurrence of a transfer condition.

2. The system of claim 1, wherein the control transfer preparation instruction is placed by the compiler several instructions ahead of the control transfer instruction.

3. The system of claim 1, wherein the additional pipeline is frozen once it is filled with instructions from the branch.

4. The system of claim 1, wherein the additional pipeline comprises a first portion and a second portion,
   the first portion comprising those stages of the additional pipeline that are upstream from any operation that may access a register that may be modified by the main pipeline;
   the second portion comprising those stages of the additional pipeline that may access a register that may be modified by the main pipeline and all stages downstream from such stages;
   wherein the first portion of the additional pipeline is filled and frozen and the second portion of the additional pipeline reexecutes every clock cycle.

5. The system of claim 1, wherein the number of additional pipelines is more than one.

6. A method of compiling a computer program that includes at least one branch instruction indicative of a branch instruction stream for execution on a computer having at least first and second pipelines, the method including the steps of:
   detecting the branch instruction in the computer program to replace the branch instruction with
   (1) a control transfer preparation instruction for initializing the second pipeline to execute the branch instruction stream, and
   (2) a control transfer instruction to execute on the first pipeline to transfer control to the second pipeline upon occurrence of a transfer condition control to the second pipeline upon occurrence of a transfer condition.

7. The method of claim 6, including the step of providing the control transfer preparation instruction with a branch address.

8. The method of claim 6, wherein the control transfer preparation instruction and the control transfer instruction are contained in an instruction stream with the control transfer preparation instruction located at least several instructions upstream the control transfer instruction.

9. The method of claim 6, including the step of continuing execution of instructions on the first pipeline in absence of occurrence of the transfer condition.

10. A method of compiling a branch instruction for execution by a computer having at least first and second pipelines, the branch instruction containing a branch address and an branch condition, the method including the steps of
   replacing the branch instruction with a control transfer preparation instruction that includes the branch address to effect initialization of the second pipeline for execution of a branch instruction stream and a control transfer instruction for execution on the first pipeline that moves control to the second pipeline upon occurrence of the branch condition.

11. A method of operating a data processor having at least first and second pipelines that includes the steps of:
   receiving at the first pipeline a control transfer preparation instruction containing a branch address to initialize the second pipeline and initiate execution of instructions from the branch address;
   receiving a control transfer instruction that is executed on the first pipeline to move control to the second pipeline upon occurrence of a transfer condition.

12. The method of claim 11, wherein the receiving step includes continuing execution of the instructions from the branch address on the first pipeline upon occurrence of the transfer condition.

13. An improved processing system, comprising:
- a first pipeline, operating with a first program counter, executing a program;
- at-least one additional pipeline operating with a second program counter;
- wherein the program comprises: at least one branch; a control transfer preparation instruction, the control transfer preparation instruction comprising a transfer address of the branch and adapted to cause initialization of the first program counter and the at least one additional pipeline for execution in the additional pipeline of instructions from the branch substantially simultaneous with execution of the program in the first pipeline; and
- a control transfer instruction, the control transfer instruction comprising an identifier for the at least one additional pipeline and adapted to cause control to move to the branch being executed in the additional pipeline upon occurrence of a transfer condition.

14. The processing system of claim 13, wherein the control transfer preparation instruction is executed several instructions before the control transfer instruction.

15. The processing system of claim 14, wherein the control transfer preparation instruction is placed in the program several instructions ahead of the control transfer instruction.

* * * * *